Jan. 3, 1928.  1,655,289
V. S. PERAZIO
FRUIT PRESS
Filed Jan. 19, 1927 2 Sheets-Sheet 1
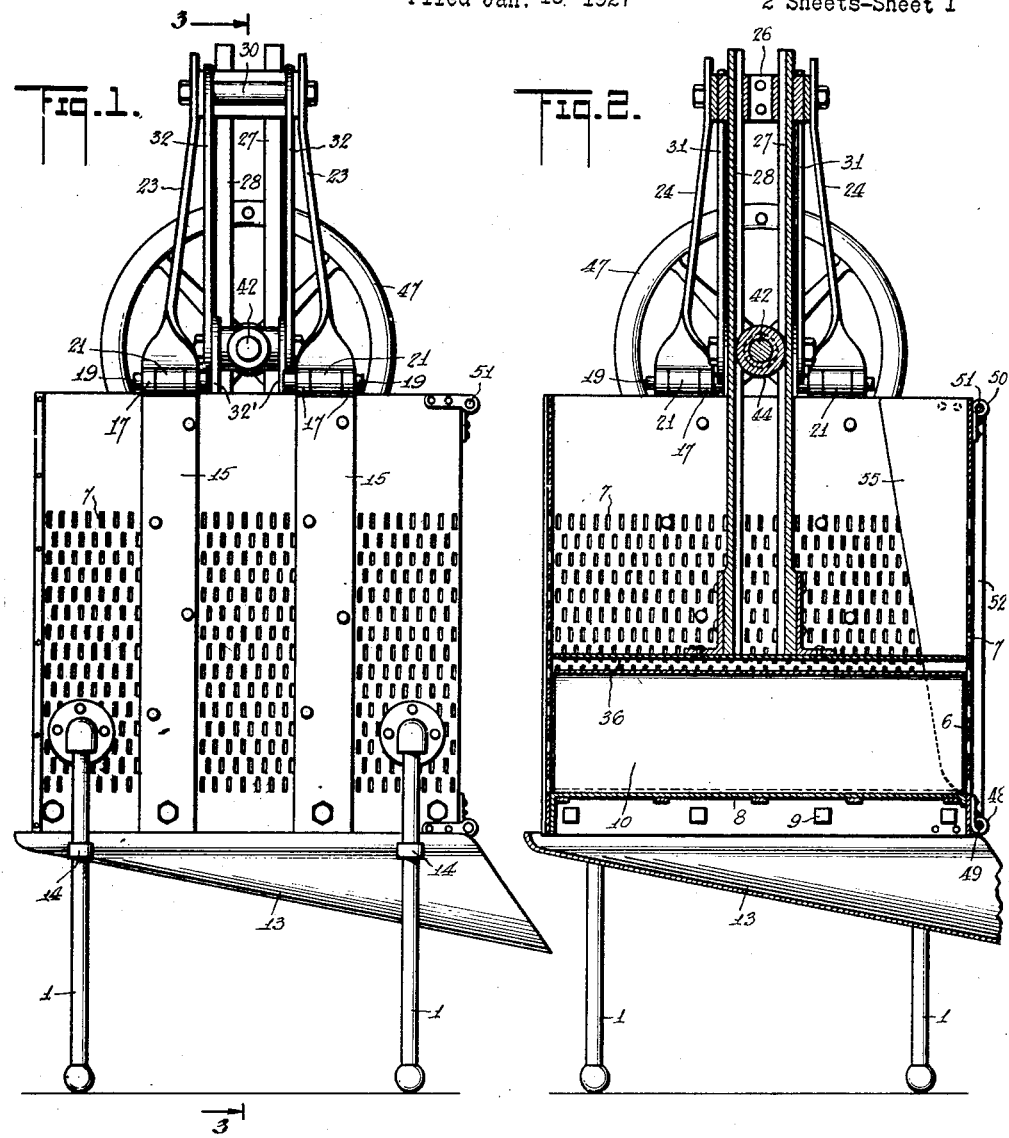
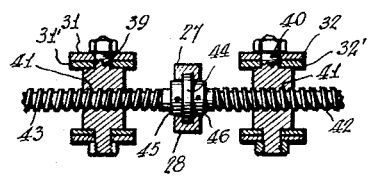
INVENTOR
Valentine S. Perazio.
BY
ATTORNEY
WITNESSES

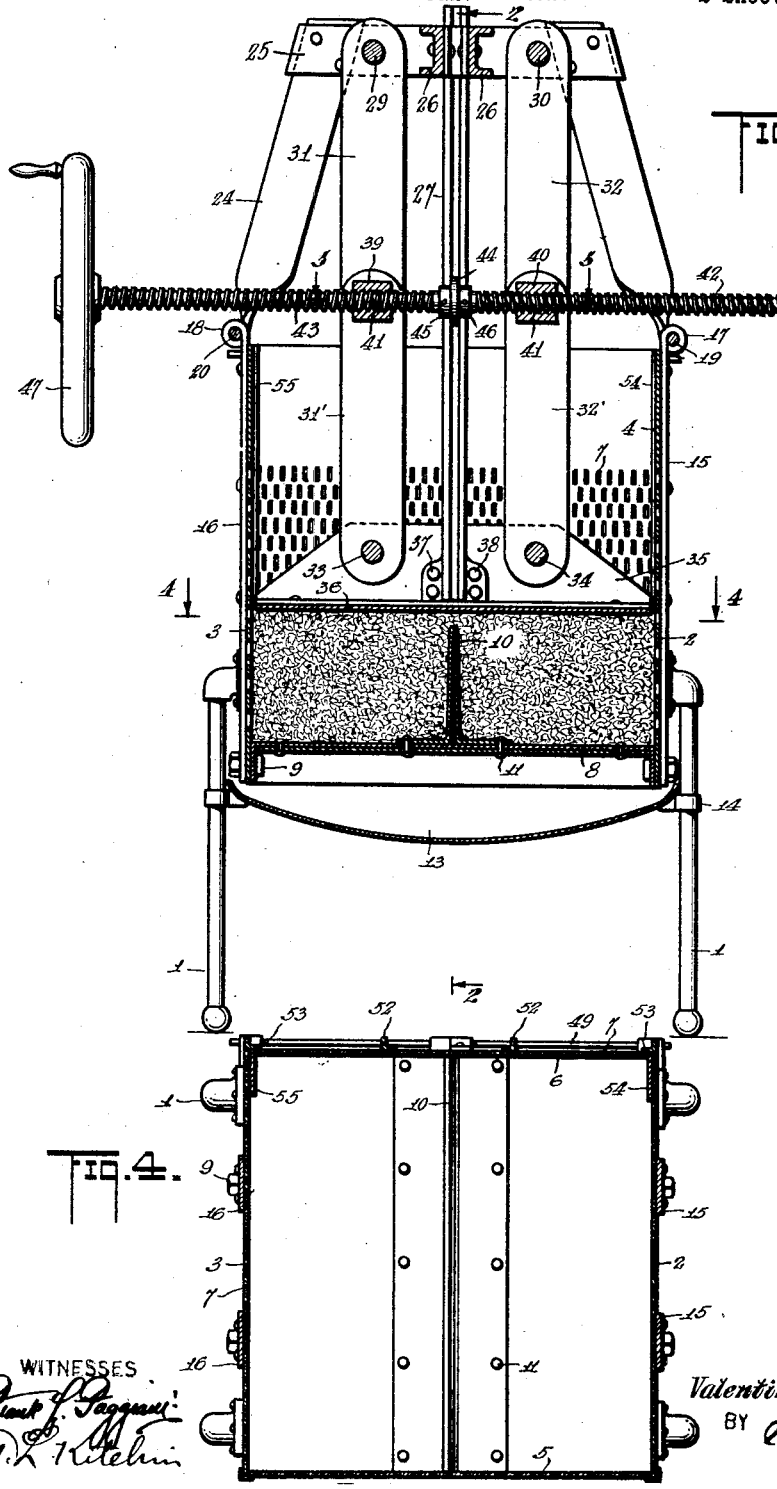

Patented Jan. 3, 1928.

1,655,289

UNITED STATES PATENT OFFICE.

VALENTINE S. PERAZIO, OF NEW YORK, N. Y.

FRUIT PRESS.

Application filed January 19, 1927. Serial No. 162,170.

This invention relates to fruit presses and has for an object to provide an improved construction wherein the pressing plate may be swung to one side when not in use.

Another object of the invention is to provide a press designed for pressing fruit, paper or other articles, the formation of the body of the press being square so that the pressed articles will be of similar contour and thus formed to be readily stacked.

A further object of the invention is to provide a fruit press wherein there is presented a division member at the bottom for dividing the pressed pulp so that it may be removed in sections.

A still further object of the invention is to provide a press wherein toggles are utilized as part of the pressing mechanism and the toggles are associated with a casing or housing or other part whereby the matter being pressed is free from a central rod or other power members.

In the accompaning drawings—

Figure 1 is a side view of a press disclosing an embodiment of the invention.

Figure 2 is a sectional view through Figure 3 on line 2—2.

Figure 3 is a sectional view through Figure 1 on line 3—3.

Figure 4 is a transverse sectional view through Figure 3 on line 4—4.

Figure 5 is a fragmentary sectional view through Figure 3 on line 5—5.

Referring to the accompanying drawings by numerals, 1 indicates the supporting legs which may be riveted or otherwise secured to the side walls 2 and 3 for supporting the body or container 4. This body or container is formed with walls 2 and 3 and also with walls 5 and 6, wall 6 being hingedly mounted whereby it may be readily swung to an open position at any time. All of the walls are provided with a number of slits or perforations 7 so that the juice from the fruit being pressed may readily flow therethrough. A bottom 8 is provided which may be provided with a stiffening web if desired and which is secured by suitable bolts or other means 9 to the side walls 2, 3 and 5. A division member 10 is connected to the bottom 8 by rivets or otherwise, said division member preferably being in the form of a piece of sheet metal bent upon itself and provided with flanges for receiving the rivets 11. This division member extends from the wall 5 to wall 6 and divides the pulp 12 into two sections so that it may be readily moved out of the body or container 4 when wall 6 is open.

When the press is used for pressing paper or other material, the pressed material will be formed in rectangular blocks whereby it may be readily stacked. Preferably the member 10 is normally spaced apart slightly so that when great pressure is brought to bear on the pulp 12 this may yield slightly when the pulp is being removed, though ordinarily, it functions merely as a dividing knife or plate. A pan 13 of any desired shape is provided and supported by suitable brackets 14 whereby the juice from fruit being pressed will be caught by this pan and directed to a discharge point. The walls 2 and 3 are provided with stiffening and reinforcing straps 15 and 16 respectively, each of said straps at the upper ends being formed with knuckles or turned over portions 17 and 18 adapted to receive pintles 19 and 20, said pintles extending through suitable looped portions 21 and 22 on the ends of the respective links 23 and 24. The links 23 and 24 are riveted or otherwise rigidly secured to suitable cross plates or beams 25, which at the center, carry a couple of angle irons 26 through which U-shaped guides 27 and 28 slide. The plates 25 also carry pins 29 and 30 on which the toggle links 31 and 32 are mounted. Co-acting toggle links 31' and 32' are pivotally mounted at 33 and 34 on the web 35 riveted or otherwise secured to the pressure plate 36. The lower ends of the guides 27 and 28 are riveted to the web 35 by suitable rivets 37 and 38 whereby these guides will move upwardly and downwardly through the guiding bars 26. Links 31 and 31' are pivotally connected together by a rod 39 and links 32 and 32' are pivotally connected together by a rod 40. Each of these rods is provided with a threaded central section 41 for receiving the respective right and left screws 42 and 43. These screws are preferably made from a single bar and provided with a disk 44 at the center held in place by suitable collars 45 and 46 riveted or otherwise secured in place. The disk 44 fits between the U-shaped guides 27 and 28 as shown in Figure 5 and, therefore, holds the screws 42 and 43 centrally as the hand wheel 47 is operated. It is, of course, evident that power could be used instead of the hand wheel and the parts would function in the same manner. Sometimes when the container 4 is unevenly rotated, there is more resistance on one side than on the other and, consequently, disk 44 is desirable in order that the toggle members and the pressure plate 36 shall properly function and that the plate 36 shall move straight down towards the bottom. By reason of the hinge structure produced by members 17 to 21 inclusive, the pressure structure may be swung to one side out of the container 4 after the pressure plate 36 has been moved forwardly to near the upper end of container 34. This is done by merely removing one of the pintles 19 or 20 and then swinging the parts to one side. When this has been done the container 4 may be supplied with fruit or in case there is a quantity of fruit therein, additional fruit may be added and the parts swung back into position and the pintle replaced.

In loading and also in unloading, this idea of quickly removing the pressure members is very desirable as it allows several batches to be pressed in a minimum time. Preferably the pressure plate 36 is moved up to near the top of the container 4 at the end of each pressing operation and is then swung to a position outside of the container. The wall or door 6 is then preferably released and swung out of the way, after which the pulp 12 is removed and the door replaced. This places the parts in position for receiving a new charge. The door or wall 6 is pivotally held in place at the lower end by the hinge structure 48 which includes a pintle 49 preferably extending entirely across the body as illustrated in Figure 4. At the upper end a similar structure is provided, namely, a hinge structure 50 with a pintle 51. Either of these pintles may be removed so that the door or wall 6 may be swung upwardly or downwardly as preferred. In order to stiffen the wall 6, one or more stiffening bars or plates 52 may be riveted or otherwise secured to the door. Also, preferably suitable plates or angle irons 53 are riveted or otherwise secured to the door 6 at each end. In this way the door is properly braced to take care of the strain during the pressing operation when presenting a structure which will function as described. In addition, door 6 is provided with tapering side members 54 and 55 whereby the door may be opened a short distance without any of the fruit or other material falling out. This will permit the container to be loaded completely or with additional fruit without swinging the head 36 and associated parts to one side as heretofore described. It is, of course, evident that the head could be swung out of the way whenever desired in addition to only slightly opening the door 6.

In operation, after the device has been loaded, hand wheel 47 is turned for forcing head 36 downwardly and when this occurs, the links 31, 31', 32 and 32' gradually move toward the position shown in Figure 3. The strain is transmitted to the sides of the container 4 and from thence to the bottom so that there is no strain on the legs 1 and there is no extra strain on the center of the body as is the case with a press having a screw connected with the bottom. After the fruit or other material has been pressed to the desired extent, hand wheel 47 is rotated in a reverse direction until the head 36 is moved up to near the top of the container 4 and then door 6 is opened and the pulp or other pressed material is removed. If desired, the door 6 could be closed until members 54 and 55 slightly overlap the walls 2 and 3 and then the container could be loaded with grapes or other fruit or other material to be pressed. After the desired loading has taken place, door 6 is closed and hand wheel 47 operated to produce a pressing operation. In case it is desired to add more fruit or other matter after a preliminary pressing action has taken place, the parts are returned to their former position and the door 6 opened slightly so that additional matter can be inserted and then the pressing action repeated. Wherever desired, the door 6 could be left closed and after the head 36 has been moved to the top of the container 4, the head and associated parts could be swung to one side for loading or otherwise treating the interior of the container.

What I claim is:

A fruit press comprising a container, a presser head mounted to operate in said container, a superstructure connected to said container and provided with a cross bar at a distance spaced above the container, toggles pivotally connected with said cross bar and said presser head respectively, a screw extending through all of said toggles for actuating the same, a pair of substantially U-shaped guiding rails rigidly secured to said presser head, said guiding rails facing each other with a space therebetween, and a disk rigidly secured to said screw near the center thereof, said disk having hub portions slidingly engaging said guides while the web of the disk fits in between the legs of each of the guides whereby the screw is allowed free rotary movement and up and down movement but not longitudinal movement.

VALENTINE S. PERAZIO.